Sept. 30, 1952  K. M. FEIERTAG  2,612,248
CLUTCH-BRAKE MECHANISM
Filed June 2, 1950
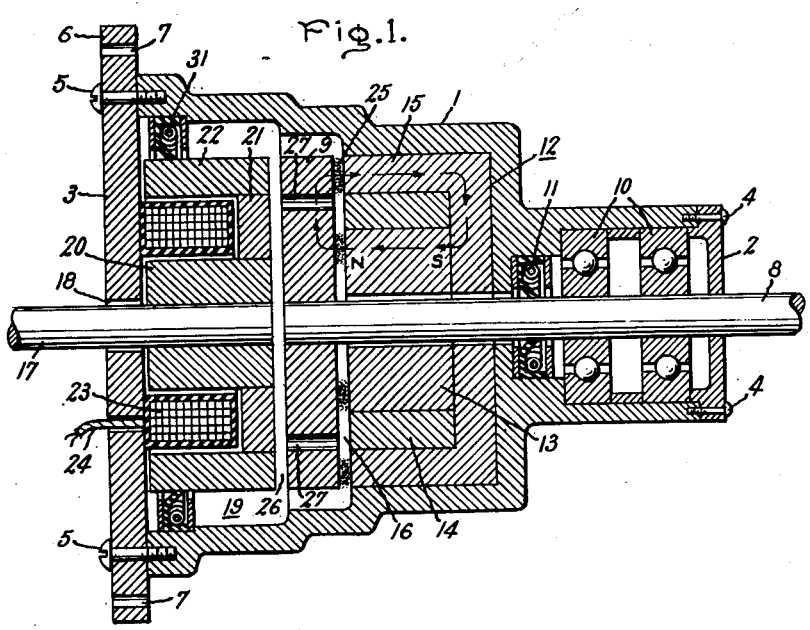
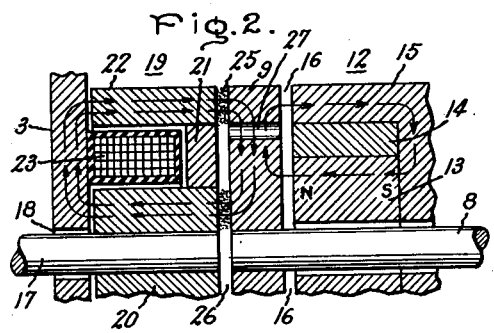
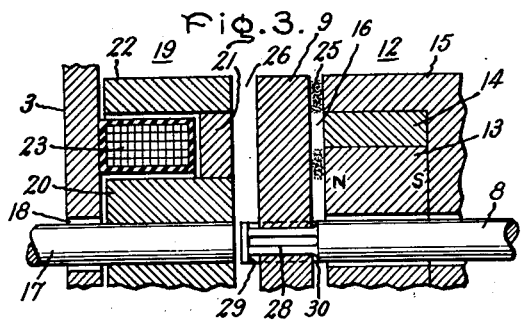
Inventor:
Karl M. Feiertag,
by Ernest C. Britton
His Attorney.

Patented Sept. 30, 1952

2,612,248

UNITED STATES PATENT OFFICE 2,612,248

CLUTCH-BRAKE MECHANISM

Karl M. Feiertag, Fort Wayne Ind., assignor to General Electric Company, a corporation of New York Application June 2, 1950, Serial No. 165,628

3 Claims. (Cl. 192—15)

My invention relates to clutch and brake mechanisms and more particularly to such a mechanism of the magnetic fluid type combined as a single unitary structure.

When the space between adjacent surfaces of two magnetic elements is filled with finely divided magnetic material and a magnetic field is established between the two surfaces, the magnetic particles bind the two elements together against movement parallel to their surfaces. The magnetic particles may be finely divided iron, and preferably these particles are mixed with oil to prevent packing and to afford a smoother operation of the clutch and brake. When this iron-oil mixture is placed under the influence of a magnetic field, the particles are mutually attracted, and the mixture seemingly "hardens," or increases in viscosity to variable densities proportional to the applied field. Since the amount of coupling of the two elements is determined by the density of the mixture, the coupling may be varied by varying the strength of the magnetic field. Since only a small amount of electrical energy will effect magnetic saturation of the iron-oil mixture, a small electromagnetic potential is adequate to obtain maximum coupling.

An object of my invention is to provide an improved magnetic clutch and brake mechanism of the magnetic fluid type.

Another object of my invention is to provide an improved clutch and brake mechanism of the magnetic fluid type wherein a magnetic field associated with the brake member causes the magnetic fluid to couple a driven member to the brake member, and a magnetic field associated with the driving member causes the magnetic fluid to couple the driving and driven members together.

A further object of my invention is to provide a combined clutch and brake mechanism of the magnetic fluid type in which a time delay occurs during which the transfer of the coupling of the driven member from one of the controlling members to the other takes place.

A still further object of my invention is to provide a combined clutch and brake mechanism of the magnetic fluid type wherein the controlled element is movable to assume a position closer to the effective controlling elements and to be coupled thereto by a magnetically susceptible mixture.

Further objects and advantages of my invention will become apparent and my invention will be better understood from the following description referring to the accompanying drawing, and the features of novelty will be pointed out with particularity in the claims annexed to and forming part of this specification.

In the drawing, Fig. 1 is a sectional view of a combined clutch and brake mechanism of the magnetic fluid type, which is provided with an embodiment of my invention; Fig. 2 is a fragmentary sectional view showing the arrangement of the iron-oil mixture when the driven member is coupled to the driving member; Fig. 3 is a fragmentary sectional view of a modification of my invention showing an axially movable driven member.

A feature of my invention is the provision of a magnetic field closed through the driven member of the mechanism in one direction so that the driven member is normally coupled to the brake member by means of a magnetically susceptible mixture in the gap between these members. A coil which is associated with the driving member of the mechanism creates a stronger magnetic field closed through the driven member in the opposite direction to the first-mentioned field producing a higher flux concentration in the gap between the driving member and the driven member and causing the magnetically susceptible mixture to concentrate in this second-mentioned gap and also acting on the mixture to cause the mixture to couple the driving and the driven members together. A second feature is the provision of holes through the driven member and a clearance between the driven member and the housing of predetermined total cross sectional area to regulate the speed at which the magnetically susceptible mixture may transfer from one side of the driven member to the other to thereby provide a time delay between the coupling of the driven member to the brake member and the coupling of the driven member to the driving member. A modification of my invention is shown in Fig. 3 wherein the driven member is drawn toward the controlling member having the magnet producing the higher magnetic flux and is coupled thereto by the magnetically susceptible mixture.

As illustrated in Fig. 1, the combined clutch and brake includes a housing 1, preferably of cylindrical cross section, made of suitable non-magnetic material and closed at the ends by removable covers or caps 2 and 3, held thereto by suitable screws or bolts 4 and 5 respectively. Cover or cap 3 is made of a suitable magnetic material and is provided with a flange 6 having holes 7 through which bolts or screws may be passed to attach the combined clutch and brake mechanism to the housing of the source of power (not shown). A driven shaft 8, to which a driven rotor 9 made of a magnetic material is secured, is supported by bearings 10 seated in an annular recess at one end of housing 1. A grease seal 11 is provided between the bearings 10 and the interior of housing 1. Rigidly secured in a cylindrical recess in housing 1 is a brake member 12 having a permanent magnet 13 which is axially magnetized. Obviously, permanent magnet 13 could be replaced by a direct current excited coil over a magnetizable core. Permanent magnet 13 is ordinarily in the form of an annular ring concentric with driven shaft 8. Surrounding permanent magnet 13 is a non-magnetic ring 14 which in turn is encased in member 15 which is L-shaped in cross section. Member 15 is made of a magnetic material and provides a portion of magnetic flux path for the magnetic field of permanent magnet 13. The flux path for the magnetic field of permanent magnet 13 is closed through driven rotor 9, as best illustrated in Fig. 1.

Axially aligned with shaft 8 is the driving shaft 17 which may be connected to any source of power (not shown). Shaft 17 extends through aperture 18 in cover 3 and carries a rigidly secured cup-shaped member 19 on its end adjacent the driven rotor 9. Cup-shaped rotor 19 comprises a magnetic ring 20 surrounding shaft 17, a spacer ring 21 made of a non-magnetic material; and an outer ring 22 of a magnetic material. An energizable magnetizing winding 23, which is annular in form, is firmly secured to cover 3 and is provided by leads 24 which are connected to the electrical supply source (not shown). A flux path for the magnetic field of winding 23 is provided by end cover 3, inner ring 20 of driving rotor 19, driven rotor 9, and outer ring 22 of driving rotor 19, as best illustrated in Fig. 2. Likewise as illustrated in Fig. 2, the magnetic field of winding 23 is stronger than that produced by permanent magnet 13. Flux through driven rotor 9 produced by winding 23 is in opposition to flux through driven rotor 9 produced by permanent magnet 13.

The cavity within housing 1 contains a magnetically susceptible mixture 25. While any magnetically susceptible mixture could be used, I prefer to use the mixture of powdered iron and oil. A grease seal 31 which is seated in an annular recess of housing 1 surrounding cup-shaped rotor 19 is provided to prevent the leakage of this mixture.

In operation, when coil 23 is not energized there is no coupling effect between rotor 19 and driven rotor 9. Under these conditions, the magnetic field created by permanent magnet 13 is closed through driven rotor 9 causing the magnetically susceptible mixture 25 to arrange itself in gap 16 as shown in Fig. 1 and to couple the driven rotor 9 to the brake member 12.

As soon as coil 23 is energized, a stronger magnetic flux concentration is created in gap 26 than exists in gap 16. However, since most of the iron powder is concentrated in gap 16, a time delay occurs until sufficient powder is drawn around the outer periphery of and through holes 27 in driven rotor 9 and arranges itself in gap 26 as shown in Fig. 2. This time delay can be accurately predetermined by the size and number of holes 27 and by the mechanical clearance between housing 1 and the outer periphery of driven rotor 9. When coil 23 is de-energized, the flux concentration in gap 16 is again greater than that in gap 26 causing the iron powder to be concentrated in gap 16 by drawing it through holes 27 and driven rotor 9 and around the periphery of rotor 9. After a time delay as described above shaft 8 resumes a normal "brake-on" condition.

In the modification of my invention shown in Fig. 3, in which like elements are shown by like reference numerals, rotor 9 is fixed to shaft 8 by means of a spline or key way so as to be axially movable. Shoulders 29 and 30 at the end of spine 28 limit this movement. Normally, rotor 9 is drawn toward permanent magnet 13 and is coupled to brake member 12 by the magnetically susceptible mixture 25 in gap 16. Coil 23 is of a size to produce a magnetic field in cup-shaped rotor 19 of sufficient strength to draw driven rotor 9 toward cup-shaped member 19 when coil 23 is energized, in opposition to the pull of permanent magnet 13. Thus when coil 23 is energized, driven rotor 9 is drawn toward cup-shaped rotor 19 and is coupled thereto by the iron-oil mixture in gap 26.

While this combined clutch and brake mechanism is intended primarily for use with direct current, satisfactory alternating current operation, especially in the higher frequencies, could be obtained by making the magnetic portion of the driving assembly of laminated material.

While I have illustrated and described particular embodiments of my invention, modifications thereof will occur to those skilled in the art. I wish it to be understood, therefore, that my invention is not limited to particular arrangements disclosed, and I intend the appended claims to cover all modifications which do not depart from the spirit and scope of my invention.

What I claim as new and desire to secure by Letters Patent of the United States, is:

1. A combined magnetic clutch and brake including a magnetizable driven rotor having oppositely disposed sides, holes through said rotor connecting said oppositely disposed sides, a brake adjacent one side of said driven rotor and forming a first gap therewith, a driving rotor adjacent the opposite side of said driven rotor and forming a second gap therewith, said gaps containing a magnetically susceptible mixture, a permanent magnet for said brake creating a magnetic field in said first gap to concentrate said mixture in said first gap and to cause said mixture to couple said driven rotor to said brake, and an energizable magnetizing winding for said driven member capable of creating a magnetic field in said second gap of greater strength than said first-mentioned magnetic field, said second-mentioned magnetic field drawing said mixture through the holes in said driven rotor thereby causing said mixture to concentrate in said second gap and then to couple said driving and said driven rotors together when said coil is energized.

2. A combined magnetic fluid clutch and brake comprising a non-magnetizable housing journaling a shaft carrying a driven rotor having oppositely disposed sides, a plurality of holes in said driven rotor connecting said sides, said driven rotor and said housing defining a peripheral clearance therebetween, a brake adjacent one side of said driven rotor and forming a first gap therewith, a driving rotor adjacent the opposite side of said driven rotor and forming a second gap therewith, said gaps containing an iron-oil mixture, magnet means for said brake creating a magnetic field in said first gap to concentrate said mixture in said first gap and to cause said mixture to couple said driven rotor to said brake, and coil means for said driving member capable of creating a magnetic field in said second gap of greater strength than said first-mentioned magnetic field, said second-mentioned magnetic field drawing said mixture through the holes in said driven rotor and around the peripheral clearance of said driven rotor causing said mixture to concentrate in said second gap and after a time delay to couple said driving and driven rotors together when said coil is energized.

3. A combined magnetic fluid clutch and brake comprising a non-magnetizable housing journaling a shaft carrying a driven rotor having oppositely disposed sides, said driven rotor and said housing defining a peripheral clearance therebetween, said peripheral clearance having a predetermined cross sectional area, a brake adjacent one side of said driven rotor and forming a first gap therewith, a driving rotor adjacent the opposite side of said driven rotor and forming a second gap therewith, said gaps containing an iron-oil mixture, magnet means for said brake creating a magnetic field in said first gap to concentrate said mixture in said first gap and to cause said mixture to couple said driven rotor to said brake, and coil means for said driving member capable of creating a magnetic field in said second gap of greater strength than said first-mentioned magnetic field, said second-mentioned magnetic field drawing said mixture around the peripheral clearance of said driven rotor causing said mixture to concentrate in said second gap and after a time delay to couple said driving and driven rotors together when said coil is energized.

KARL M. FEIERTAG.

REFERENCES CITED

The following references are of record in the file of this patent:

UNITED STATES PATENTS

| Number | Name | Date |
|---|---|---|
| 1,155,124 | Berger | Sept. 28, 1915 |
| 2,233,060 | Parvin | Feb. 25, 1941 |
| 2,333,863 | Hull | Nov. 9, 1943 |
| 2,411,122 | Winther | Nov. 12, 1946 |

FOREIGN PATENTS

| Number | Country | Date |
|---|---|---|
| 485,591 | Belgium | Oct. 30, 1948 |

OTHER REFERENCES

Bureau of Standards Technical Report 1213 of March 1948.